US012810268B2

(12) United States Patent
Hill et al.

(10) Patent No.: US 12,810,268 B2
(45) Date of Patent: Nov. 24, 2026

(54) SYSTEMS AND METHODS FOR REMOTE ATM ACCESS

(71) Applicant: Wells Fargo Bank, N.A., San Francisco, CA (US)

(72) Inventors: Miranda C. Hill, Seattle, WA (US); Alicia Y. Moore, San Ramon, CA (US); Steven E. Puffer, Champlin, MN (US); Jerome Rhodes, Hayward, CA (US); Susan Symons, San Francisco, CA (US); Michael R. Thomas, San Francisco, CA (US); Young M. Yang, San Francisco, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/830,396

(22) Filed: Sep. 10, 2024

(65) Prior Publication Data

US 2024/0428215 A1 Dec. 26, 2024

Related U.S. Application Data

(63) Continuation of application No. 17/833,730, filed on Jun. 6, 2022, now Pat. No. 12,125,009, which is a
(Continued)

(51) Int. Cl.
*G06Q 20/10* (2012.01)
*G06K 7/10* (2006.01)
(Continued)

(52) U.S. Cl.
CPC ..... *G06Q 20/1085* (2013.01); *G06K 7/10712* (2013.01); *G06Q 20/3223* (2013.01);
(Continued)

(58) Field of Classification Search
USPC .......................................................... 705/43
See application file for complete search history.

(56) References Cited

U.S. PATENT DOCUMENTS 6,386,323 B1 5/2002 Ramachandran et al.
6,546,343 B1 4/2003 Batra et al.
(Continued)

FOREIGN PATENT DOCUMENTS

AU 2012372778 A1 * 7/2014 ............ G06Q 20/40
CA 3038728 A1 * 4/2018 ......... G06Q 20/4016
(Continued)

OTHER PUBLICATIONS

"American Banker, Why Wintrust Financial is Testing Cardless ATM transactions, Jul. 2013, Source Media, vol. 178, 1-2" (Year: 2013).

(Continued)

*Primary Examiner* — Ayal I. Sharon
(74) *Attorney, Agent, or Firm* — Foley & Lardner LLP

(57) ABSTRACT

A system includes a database that stores user information regarding a plurality of customers; a network interface configured to communicate data over a network; and a processing circuit. The processing circuit is configured to: receive, from a customer computing device, a first indication that a customer is within a first predetermined distance of a first customer area and activate, based on the first indication, an interface of the customer computing device. The interface is configured to receive an input. The processing circuit is further configured to receive a second indication that the customer is within a second predetermined distance of a second customer area that is within the first customer area and authorize, based on the second indication and reception of the input, a transaction at the terminal.

17 Claims, 4 Drawing Sheets

Related U.S. Application Data continuation of application No. 15/396,360, filed on Dec. 30, 2016, now Pat. No. 11,354,632, which is a continuation of application No. 15/377,311, filed on Dec. 13, 2016, now Pat. No. 11,354,631.

(60) Provisional application No. 62/317,322, filed on Apr. 1, 2016.

(51) Int. Cl.

| | |
|---|---|
| ***G06Q 20/32*** | (2012.01) |
| ***G06Q 20/38*** | (2012.01) |
| ***G06Q 20/40*** | (2012.01) |
| ***G07F 19/00*** | (2006.01) |
| ***H04L 67/52*** | (2022.01) |
| ***H04W 4/02*** | (2018.01) |
| ***H04W 76/10*** | (2018.01) |

(52) U.S. Cl.
CPC ....... *G06Q 20/3224* (2013.01); *G06Q 20/385* (2013.01); *G06Q 20/4014* (2013.01); *G06Q 20/4015* (2020.05); *G06Q 20/4037* (2013.01); *G07F 19/203* (2013.01); *G07F 19/207* (2013.01); *H04L 67/52* (2022.05); *H04W 4/02* (2013.01); *H04W 76/10* (2018.02)

(56) References Cited

U.S. PATENT DOCUMENTS 6,760,046 B2 7/2004 I'Anson et al.
7,446,433 B2 11/2008 Masciarelli et al.
7,615,890 B2 11/2009 Masciarelli et al.
7,665,122 B2 2/2010 Torii
7,669,757 B1 3/2010 Crews et al.
8,086,519 B2 12/2011 Mylet et al.
8,148,846 B2 4/2012 Masciarelli et al.
8,260,707 B2 9/2012 Treadwell et al.
8,271,662 B1 9/2012 Gossweiler et al.
8,295,898 B2 10/2012 Ashfield et al.
8,438,066 B1 5/2013 Yuen et al.
8,496,168 B1 7/2013 Miller et al.
8,604,640 B2 12/2013 Masciarelli et al.
8,625,796 B1 * 1/2014 Ben Ayed ............. H04W 12/64 380/258
8,632,000 B2 1/2014 Laracey
8,639,621 B1 1/2014 Ellis et al.
8,646,060 B1 * 2/2014 Ben Ayed ............... H04W 4/20 726/9
8,692,512 B2 4/2014 Tanikawa et al.
8,924,292 B1 12/2014 Ellis et al.
8,924,712 B2 * 12/2014 Varadarajan .......... H04W 12/06 713/155
8,930,271 B1 1/2015 Ellis et al.
8,994,328 B2 3/2015 Lee
9,002,272 B2 4/2015 Friedlaender
9,019,066 B2 4/2015 Black et al.
9,030,051 B2 5/2015 Muratov
9,033,217 B2 5/2015 Williams et al.
9,117,242 B1 8/2015 Ellis et al.
9,153,989 B2 10/2015 Matsunaga et al.
9,286,726 B2 3/2016 Balram et al.
9,311,632 B1 4/2016 Dent
9,356,659 B2 5/2016 Partovi
9,380,421 B1 6/2016 Vltavsky
9,384,486 B2 7/2016 Gurnani et al.
9,446,674 B2 9/2016 Halker et al.
9,484,985 B2 11/2016 Kim et al.
9,519,934 B2 12/2016 Calman et al.
9,583,803 B2 2/2017 Miller et al.
9,666,915 B2 5/2017 Miller et al.
9,834,104 B2 12/2017 Tsukamoto
9,837,646 B2 12/2017 Miller et al.
9,859,594 B2 1/2018 Miller et al.
9,905,358 B2 2/2018 Wakabayashi
9,925,886 B2 3/2018 Halker et al.
9,941,755 B2 4/2018 Hwang
9,991,753 B2 6/2018 Miller et al.
10,056,790 B2 8/2018 Miller et al.
10,074,837 B2 9/2018 Miller et al.
10,189,364 B2 1/2019 Ichikawa et al.
10,286,796 B2 5/2019 Lee et al.
10,300,805 B2 5/2019 Halker et al.
10,373,148 B1 8/2019 Dixon et al.
10,387,876 B1 8/2019 Buentello et al.
10,399,451 B2 9/2019 Zaki et al.
10,471,836 B2 11/2019 Yabuuchi
10,479,209 B2 11/2019 Yabuuchi et al.
10,793,017 B2 10/2020 Lee
10,836,273 B2 11/2020 Zhu
10,899,234 B2 1/2021 Ichikawa et al.
10,910,875 B2 2/2021 Teng
10,990,955 B2 4/2021 Skelsey et al.
11,018,533 B2 5/2021 Kanakasabai et al.
11,075,542 B2 7/2021 Wan
11,173,794 B2 11/2021 Tsukamoto
11,233,423 B2 1/2022 Wan
11,354,632 B1 * 6/2022 Hill ....................... H04W 12/73
11,355,963 B2 6/2022 Wan
11,368,050 B2 6/2022 Wan et al.
11,376,986 B2 7/2022 Ezer
11,390,186 B2 7/2022 Murai et al.
11,437,848 B2 9/2022 Wan et al.
11,451,139 B2 9/2022 Forouzesh et al.
11,539,219 B2 12/2022 Wan et al.
11,829,988 B2 * 11/2023 Iqbal ....................... G06F 21/31
11,843,271 B2 12/2023 Murai et al.
11,880,786 B2 1/2024 Tokuoka
11,984,726 B2 5/2024 Suzuki et al.
12,057,726 B2 8/2024 Murai et al.
12,083,899 B2 9/2024 Suzuki et al.
12,100,987 B2 9/2024 Hao et al.
12,125,009 B1 10/2024 Hill et al.
12,142,145 B2 11/2024 Suzuki et al.
2004/0153377 A1 8/2004 Dallman
2004/0243515 A1 12/2004 Kurihara et al.
2005/0162019 A1 7/2005 Masciarelli et al.
2008/0052245 A1 2/2008 Love
2008/0109375 A1 5/2008 Ricci et al.
2008/0114697 A1 5/2008 Black et al.
2009/0015374 A1 1/2009 Ghosh
2010/0012484 A1 1/2010 Citti et al.
2010/0205063 A1 8/2010 Mersky
2011/0136429 A1 6/2011 Ames et al.
2011/0161276 A1 6/2011 Krumm et al.
2011/0202466 A1 8/2011 Carter
2011/0213983 A1 9/2011 Staugaitis et al.
2011/0238573 A1 9/2011 Varadarajan
2011/0254505 A1 10/2011 Evander et al.
2011/0288997 A1 11/2011 Mcbride
2011/0314153 A1 12/2011 Bathiche et al.
2012/0068663 A1 3/2012 Tanikawa et al.
2012/0127308 A1 5/2012 Eldershaw et al.
2012/0196586 A1 8/2012 Grigg et al.
2012/0200258 A1 8/2012 Lee
2012/0209773 A1 8/2012 Ranganathan
2012/0253913 A1 10/2012 Richard
2012/0271883 A1 10/2012 Montoya et al.
2012/0309305 A1 12/2012 Kim et al.
2013/0005253 A1 1/2013 Grigg et al.
2013/0057073 A1 3/2013 Masciarelli et al.
2013/0124411 A1 5/2013 Kobres et al.
2013/0127409 A1 5/2013 Ichikawa
2013/0147279 A1 6/2013 Muratov
2013/0178233 A1 * 7/2013 McCoy ................. H04W 4/027 455/456.3
2013/0238497 A1 9/2013 Ramachandran et al.
2013/0249479 A1 9/2013 Partovi
2013/0271069 A1 10/2013 Partovi
2013/0281017 A1 10/2013 Bondesen et al.
2013/0282283 A1 10/2013 Bondesen et al.
2013/0311017 A1 11/2013 Matsunaga et al.
2014/0019336 A1 1/2014 Browne et al.

(56) References Cited

U.S. PATENT DOCUMENTS

| | | | |
|---|---|---|---|
| 2014/0040138 | A1 | 2/2014 | Henry |
| 2014/0040139 | A1 | 2/2014 | Brudnicki et al. |
| 2014/0089188 | A1 | 3/2014 | Rao |
| 2014/0172703 | A1 | 6/2014 | Black |
| 2014/0279490 | A1 | 9/2014 | Calman et al. |
| 2014/0279491 | A1 | 9/2014 | Martin et al. |
| 2015/0015419 | A1 | 1/2015 | Halker et al. |
| 2015/0026057 | A1 | 1/2015 | Calman et al. |
| 2015/0058224 | A1 | 2/2015 | Gaddam et al. |
| 2015/0115731 | A1 | 4/2015 | Wakabayashi |
| 2015/0123610 | A1 | 5/2015 | Zaki et al. |
| 2015/0172920 | A1 * | 6/2015 | Ben Ayed ............. H04W 12/63 713/172 |
| 2015/0229623 | A1 | 8/2015 | Grigg et al. |
| 2015/0254655 | A1 | 9/2015 | Bondesen et al. |
| 2015/0270718 | A1 | 9/2015 | Hwang |
| 2015/0287017 | A1 | 10/2015 | Iqbal et al. |
| 2015/0287018 | A1 | 10/2015 | Iqbal et al. |
| 2015/0294296 | A1 | 10/2015 | Koeppel et al. |
| 2015/0294306 | A1 | 10/2015 | Grigg et al. |
| 2015/0294307 | A1 | 10/2015 | Grigg et al. |
| 2015/0362333 | A1 | 12/2015 | Miller et al. |
| 2015/0364799 | A1 | 12/2015 | Miller et al. |
| 2015/0364945 | A1 | 12/2015 | Miller et al. |
| 2015/0365135 | A1 | 12/2015 | Miller et al. |
| 2015/0365136 | A1 | 12/2015 | Miller et al. |
| 2015/0365137 | A1 | 12/2015 | Miller et al. |
| 2015/0365138 | A1 | 12/2015 | Miller et al. |
| 2015/0365737 | A1 | 12/2015 | Miller et al. |
| 2016/0012403 | A1 | 1/2016 | Kursun et al. |
| 2016/0012412 | A1 | 1/2016 | Scanlon et al. |
| 2016/0012505 | A1 | 1/2016 | Hanson et al. |
| 2016/0012527 | A1 | 1/2016 | Hanson |
| 2016/0014552 | A1 | 1/2016 | Hanson et al. |
| 2016/0014553 | A1 | 1/2016 | Cardinal et al. |
| 2016/0046194 | A1 | 2/2016 | Tsukamoto |
| 2016/0086143 | A1 | 3/2016 | Hao et al. |
| 2016/0098882 | A1 | 4/2016 | Holdych et al. |
| 2016/0162855 | A1 | 6/2016 | Johnson et al. |
| 2016/0318414 | A1 | 11/2016 | Ichikawa et al. |
| 2016/0321627 | A1 | 11/2016 | Mccracken et al. |
| 2017/0018001 | A1 | 1/2017 | Tunnell et al. |
| 2017/0101024 | A1 | 4/2017 | Halker et al. |
| 2017/0125758 | A1 | 5/2017 | Miller et al. |
| 2017/0358942 | A1 | 12/2017 | Pugh et al. |
| 2018/0018704 | A1 | 1/2018 | Tunnell et al. |
| 2018/0130984 | A1 | 5/2018 | Miller et al. |
| 2018/0141443 | A1 | 5/2018 | Lee et al. |
| 2018/0141444 | A1 | 5/2018 | Lee et al. |
| 2018/0165663 | A1 | 6/2018 | Naik et al. |
| 2018/0215278 | A1 | 8/2018 | Yabuuchi |
| 2018/0236888 | A1 | 8/2018 | Yabuuchi et al. |
| 2018/0248413 | A1 | 8/2018 | Miller et al. |
| 2018/0272885 | A1 | 9/2018 | Halker et al. |
| 2018/0302414 | A1 | 10/2018 | Wagner |
| 2019/0034915 | A1 | 1/2019 | Van Wiemeersch et al. |
| 2019/0081497 | A1 | 3/2019 | Pugh et al. |
| 2019/0118664 | A1 | 4/2019 | Ichikawa et al. |
| 2019/0173309 | A1 | 6/2019 | Jung |
| 2019/0176654 | A1 | 6/2019 | Lee |
| 2019/0305587 | A1 | 10/2019 | Teng |
| 2019/0356156 | A1 | 11/2019 | Wan et al. |
| 2019/0372387 | A1 | 12/2019 | Wan et al. |
| 2019/0379245 | A1 | 12/2019 | Wan |
| 2019/0389315 | A1 | 12/2019 | Zhu |
| 2020/0014252 | A1 | 1/2020 | Wan et al. |
| 2020/0021130 | A1 | 1/2020 | Wan |
| 2020/0036215 | A1 | 1/2020 | Wan |
| 2020/0086756 | A1 | 3/2020 | Beaude et al. |
| 2020/0099256 | A1 | 3/2020 | Kanakasabai et al. |
| 2020/0235656 | A1 | 7/2020 | Forouzesh et al. |
| 2020/0364720 | A1 * | 11/2020 | Lally .................. G06Q 20/4037 |
| 2020/0403458 | A1 | 12/2020 | Vedady Moghadam Nanehkaran et al. |
| 2020/0406774 | A1 | 12/2020 | Tsukamoto |
| 2021/0027295 | A1 | 1/2021 | Raquepaw et al. |
| 2021/0309119 | A1 | 10/2021 | Ezer |
| 2021/0326778 | A1 | 10/2021 | Tokuoka |
| 2022/0060043 | A1 | 2/2022 | Hao et al. |
| 2022/0153163 | A1 | 5/2022 | Murai et al. |
| 2022/0158470 | A1 | 5/2022 | Murai et al. |
| 2022/0161687 | A1 | 5/2022 | Al-Sagheer et al. |
| 2022/0176823 | A1 | 6/2022 | Suzuki et al. |
| 2023/0032915 | A1 | 2/2023 | Suzuki et al. |
| 2023/0406137 | A1 | 12/2023 | Yamamoto et al. |
| 2024/0083275 | A1 | 3/2024 | Li et al. |
| 2024/0088677 | A1 | 3/2024 | Murai et al. |
| 2024/0097467 | A1 | 3/2024 | Murai et al. |
| 2024/0116378 | A1 | 4/2024 | Ikezoe et al. |
| 2024/0120742 | A1 | 4/2024 | Suzuki et al. |
| 2024/0140242 | A1 | 5/2024 | Kromrey et al. |
| 2024/0217379 | A1 | 7/2024 | Lin et al. |
| 2024/0317080 | A1 | 9/2024 | Nakagawa et al. |
| 2024/0317099 | A1 | 9/2024 | Wang et al. |
| 2024/0359590 | A1 | 10/2024 | Oka et al. |
| 2025/0156840 | A1 * | 5/2025 | Goodsitt .............. G06Q 20/354 |
| 2025/0156845 | A1 * | 5/2025 | Goodsitt .............. G06Q 20/409 |

FOREIGN PATENT DOCUMENTS

| | | | | |
|---|---|---|---|---|
| CA | 3045801 C | * | 7/2022 | ......... G06Q 20/3223 |
| EP | 2 587 432 A1 | | 1/2013 | |
| WO | WO-2005079079 A2 | * | 8/2005 | ............. G06F 21/34 |
| WO | WO-2013/001133 A1 | | 1/2013 | |

OTHER PUBLICATIONS

"Automated Facial Recognition in the Public and Private Sectors, Office of the Privacy Commissioner of Canada, 2013, 3-8" (Year: 2013).

"NCR Mobile Cash Withdrawal Lets Consumers Pre-stage Cash Transactions Using Their Mobile Banking App and Complete the Withdrawal by Scanning a 2D Barcode on Their Bank's ATM. The Transaction at the ATM Can Take Less Than 10 Seconds", The Street, Jun. 11, 2012, 2 pages.

"Zoltan Pozsar, The rise and Fall of the Shadow Banking System, 2008, Moody's Economy, 15-16" (Year: 2008).

Bernier, Paula, "Ellerman Sees Security, Intersection of e-Commerce and Mobile Marketing as Leading Trends", Mobile Commerce Insider, Dec. 4, 2013, 2 pages.

Friedlin, Ashley "Six Trends in Advertising You Need to Know for 2014", MarketingWeek, Jan. 17, 2014, 3 pages.

Srivatsa et al., "RFID & Mobile Fusion for Authenticated ATM Transaction", International Journal of Computer Applications (0975-0887), vol. 3- No. 5, Jun. 2010. 6 pages.

* cited by examiner

SYSTEMS AND METHODS FOR REMOTE ATM ACCESS

CROSS-REFERENCE TO RELATED PATENT APPLICATIONS

This application is a continuation of U.S. patent application Ser. No. 17/833,730, entitled "Systems and Methods for Remote ATM Access," filed Jun. 6, 2022, which is a continuation of U.S. patent application Ser. No. 15/396,360, entitled "Systems and Methods for Remote ATM Access," filed Dec. 30, 2016, which is a continuation of U.S. patent application Ser. No. 15/377,311, entitled "Systems and Methods for Remote ATM Access," filed Dec. 13, 2016, which claims priority to U.S. Provisional Application 62/317,322, entitled "Systems and Methods for Remote ATM Access," filed Apr. 1, 2016, each of which are incorporated herein by reference in their entireties.

BACKGROUND

Generally, when a user wishes to complete a transaction, such as withdrawing funds from an automated teller machine (ATM), the user first has to authenticate himself to the ATM. To do so, the user presents their debit card by inserting the debit card into a card reader or by tapping their phone to transmit a token associated with that debit card. The user then enters an account personal identification number (PIN) at the ATM. At drive-through ATMs, this task may be particularly cumbersome. For example, the user may have to open his car window during the cold or rain to manually insert the debit card or tap his phone and to manually enter the PIN at the ATM. This manual activity presents problems. For example, the user may accidentally drop and damage the smartphone while attempting to tap the phone at the ATM. As another example, by opening the window of his car to access the ATM, the user may expose himself to bad weather (e.g., rain, extreme cold, extreme heat, etc.) for prolonged periods of time.

SUMMARY OF THE INVENTION

One embodiment relates to a system. The system includes a customer database that stores user information concerning a plurality of customers. The system also includes a network interface configured to communicate data over a network. The system also includes a processing circuit comprising a processor and memory, the memory structured to store instructions that are executable by the processor and cause the processing circuit to receive an indication that a customer is within a predetermined distance from an automated teller machine (ATM). The instructions also cause the processing circuit to transmit, responsive to receiving the indication, an authorization signal to a customer computing device associated with the customer, the authorization signal configured to activate an ATM pre-stage function of an application implemented on the customer computing device. The instructions also cause the processing circuit to receive, by the network interface over the network, customer transaction preferences from the customer computing device. The instructions also cause the processing circuit to authorize an ATM transaction at the ATM based on the received customer transaction preferences.

Another embodiment relates to a method. The method includes receiving, by a processor of a financial institution computing system associated with a financial institution, an indication that a customer is within a predetermined distance from an automated teller machine (ATM). The method also includes transmitting, by the processor, responsive to receiving the indication, an authorization signal to a customer computing device associated with the customer, the authorization signal configured to activate an ATM pre-stage function of an application implemented on the customer computing device. The method also includes receiving, by the processor, customer transaction preferences from the customer computing device. The method also includes authorizing, by the processor, an ATM transaction at the ATM based on the received customer transaction preferences.

Another embodiment relates to a mobile device. The mobile device includes a network interface structured to communicate data to and from a financial institution computing system associated with a financial institution, an automated teller machine (ATM), and a broadcasting device. The mobile device also includes a display device configured to present information to a customer. The mobile device also includes an input/output device structured to exchange data with the customer. The mobile device also includes a processing circuit comprising a processor and memory, the memory structured to store instructions that are executable by the processor and cause the processing circuit to transmit, by the network interface, location information to the computing system associated with the financial institution, the location information indicating that the mobile device is within a predetermined distance of an automated teller machine (ATM). The instructions also cause the processing circuit to receive, by the network interface, an ATM pre-authorization signal from the financial institution computing system. The instructions also cause the processing circuit to present, via the display device, responsive to receiving the ATM pre-authorization signal, an ATM pre-stage interface to the customer enabling the customer to indicate transaction preferences. The instructions also cause the processing circuit to receive, via the input/output device, transaction preferences for an ATM transaction at the ATM from the customer. The instructions also cause the processing circuit to transmit, via the network interface, the transaction preferences to the computing system associated with the financial institution.

DETAILED DESCRIPTION

Referring to the figures generally, systems and methods of remotely initiating an ATM transaction are described. As a customer approaches an ATM, the ATM (or underlying backend computer system) determines that the customer is approaching the ATM and may want to initiate an ATM transaction based on a determined proximity of the customer to the ATM. For example, if the customer is waiting in line at a drive-up ATM, the system can determine that the customer is approaching the ATM (e.g., based on a user device being in proximity to a location beacon, based on location information provided from the user device to the system, etc.). Accordingly, the system can trigger a user device (e.g., a smartphone, a car infotainment system, a tablet, etc.) to display a user interface that allows the customer to remotely initiate an ATM transaction that can be finalized at the ATM. As a result, the customer spends less time at the ATM which, in turn, reduces wait times at the ATM and increases the number of customer transactions that the ATM can process in a given amount of time.

Figure 1:
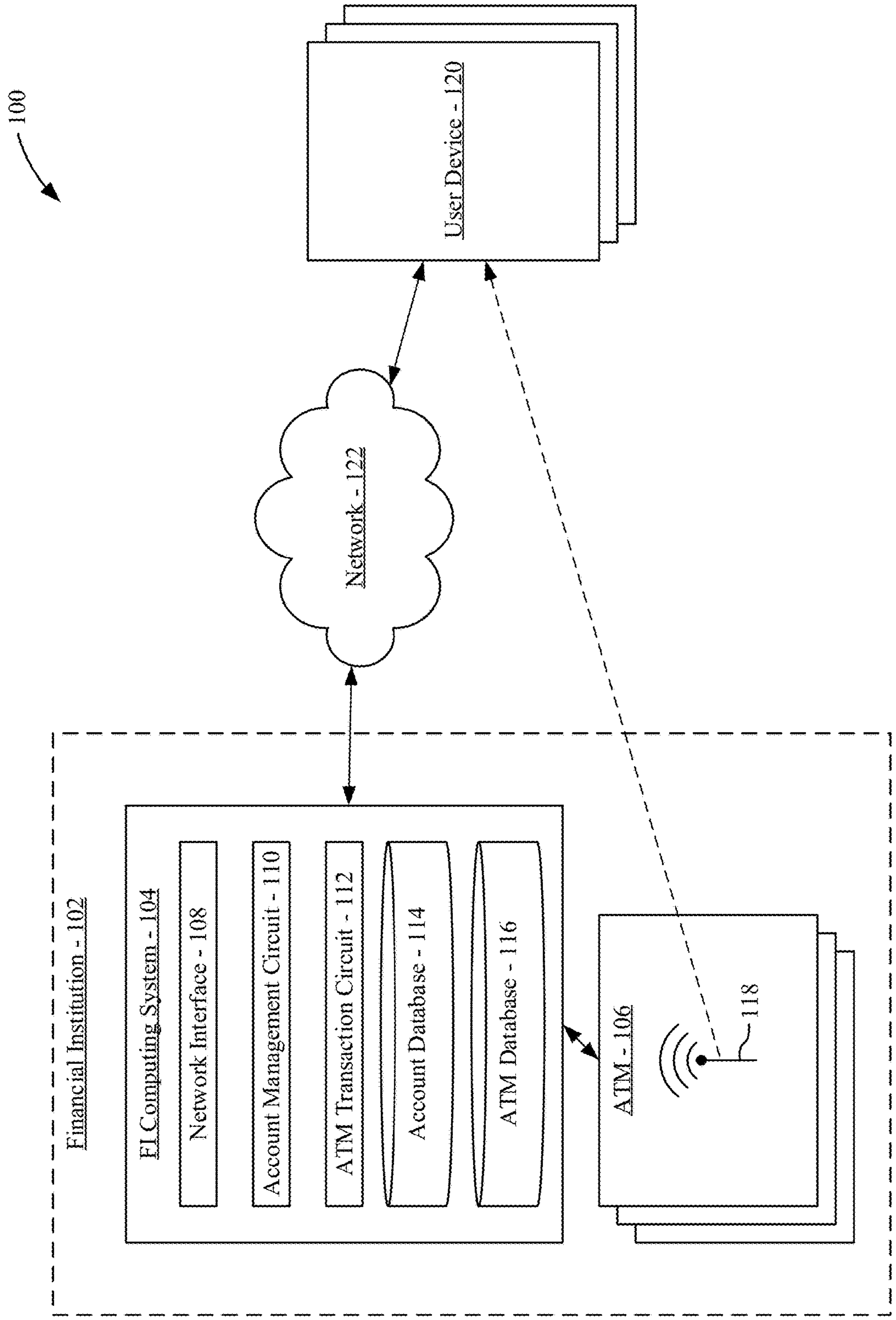
FIG. 1 is a block diagram of a computing system for a financial institution according to an example embodiment.

Referring to FIG. 1, a block diagram of a computing system 100 for a financial institution 102 is shown according to an example embodiment. Generally, the financial institution 102 provides financial services (e.g., demand deposit accounts, credit accounts, etc.) to a plurality of customers. The financial institution 102 includes a financial institution ("FI" in FIG. 1) computing system 104 and an ATM network having a plurality of ATMs 106. The ATMs are located at a plurality of physical locations that can be visited by customers (e.g., bank branches, malls, airports, stores, drive-through banking centers, bars, restaurants, offices, etc.). The financial institution 102 provides banking services to the customers via the ATMs 106. For example, customers can authenticate themselves at a given ATM 106 and deposit funds into accounts, withdraw funds from accounts, transfer funds between accounts, view account balances, and the like. As described in further detail below, the financial institution 102 allows a customer to remotely initiate a transaction at an ATM 106 when the customer is determined to be in proximity to the ATM 106 for later completion at the ATM 106.

The financial institution computing system 104 is a back-end computer system that supports the ATMs 106 and other financial services offered by the financial institution. Accordingly, the financial institution computing system 104 includes a network interface 108, an account management circuit 110, an ATM transaction circuit 112, an account database 114, and an ATM database 116. The network interface 108 is structured to facilitate data communication with other computing devices (e.g., ATMs 106, user devices 120, etc.) directly or via a network (e.g., network 122, a private internal network associated with the financial institution 102, etc.). The network interface 108 may communicate over any of a variety of network protocols, including Ethernet, Bluetooth, WiFi, and the like. The account management circuit 110 is structured to maintain accounts associated with customers of the financial institution 102 and to facilitate transactions associated with the accounts. The ATM transaction circuit 112 is structured to facilitate customer transactions via the ATMs 106. As described in further detail below, the ATM transaction circuit 112 also interfaces with customer devices 120 to facilitate remote ATM transaction initiation and completion. The account database 114 stores customer account information, including account numbers, account balances, customer contact information, customer preferences, and other account information. The ATM database 116 stores information relating to the ATMs 106, such as ATM location information, ATM capability information, ATM service information, and the like.

The financial institution 102 includes a plurality of ATMs 106. In some arrangements, the ATMs 106 may have different capabilities. For example, a first ATM may be able to both dispense cash for withdrawals and receive cash for deposits, while a second ATM may not have the capability to receive cash for deposits. Each of the ATMs 106 communicates with the financial institution computing system 104 via the network 122 or an internal private network. The ATMs 106 are used by customers of the financial institution 102 to receive financial services and to perform financial transactions. In some arrangements, the ATMs 106 can communicate with user devices 120 to execute transactions via wireless communication protocols, such as WiFi, Bluetooth, near field communication (NFC), and the like. For example, a customer can tap a properly configured user device 120 at an ATM 106 to transmit a payment card token associated with the customer's debit card via NFC to the ATM 106 thereby eliminating the need for the customer to dip his credit card into a reader of the ATM 106.

In some arrangements, each of the ATMs 106 is associated with a locator beacon 118. In other arrangements, a grouping of ATMs 106 is associated with at least one locator beacon 118. In further arrangements, a locator beacon 118 can be associated with an area near an ATM 106. The locator beacon 118 may be positioned on, inside of, or in the vicinity of a given ATM 106. Each locator beacon 118 broadcasts a unique beacon identifier within a limited range of the beacon. In some arrangements, the locator beacons 118 are Bluetooth® Low Energy beacons (e.g., iBeacons®). In other arrangements, the locator beacons 118 are wireless network transmitters or access points, and the unique beacon identifier is a wireless network SSID. The limited range of the beacon may have a maximum broadcast range of approximately 10 meters. The maximum broadcast range may be increased or decreased by respectively increasing or decreasing the broadcast power of each beacon. In some arrangements, a plurality of beacons can be used to geo-fence a large area, a plurality of beacons that designate sub-areas within a single area, such as individual drive-through lanes, etc.). In some arrangements, location identifier devices 118 can be associated with other items or areas, such as the drive-up lane that guides vehicles to a drive-up ATM.

Each of the locator beacons 118 geo-fences the associated location by broadcasting the unique identifier such that a location aware device (e.g., the user device 120) can determine that it is in a certain location based on the received unique identifier. As described in further detail below, when a customer brings a user device 120 capable of receiving signals from the locator beacons 114, an interface of an application being executed on the user device 120 can be changed to allow the customer to initiate a transaction with an associated ATM before the customer is authenticated at the ATM. In some arrangements, the associations of unique identifiers and ATMs is maintained by the financial institution computing system 102 in the ATM database 116. Each entry in the database includes a beacon identifier (e.g., a serial number that is broadcast from the beacon, an SSID, etc.) and an associated ATM identifier (e.g., a unique identifier that identifies a specific ATM 106 or a grouping of ATMs 106 in a specific location).

Still referring to FIG. 1, customers of the financial institution 102 can access the various services provided by the financial institution 102 through user devices 120. The user devices 120 include personal computing devices such as laptops, PDAs, portable media devices, smartphones, tablet computing devices, wearable computing devices (e.g., a smartwatch, smart optical wear, etc.), vehicle infotainment systems (e.g., a computing device mounted inside of a vehicle and that includes a display and user input to present vehicle information, entertainment media, applications, navigation information and the like to passengers of a vehicle), etc. that may access one or more programs, servers, networks, central computers, etc. The user devices 120 communicate with the financial institution computing system 104 of the financial institution 102 through the network 122. In some arrangements, the network 110 includes the internet. The user devices 120 may execute a financial institution application associated with the financial institution 102. In some arrangements, the application is executed locally on the user device 120 (e.g., a smartphone application, a vehicle infotainment device application). In other arrangements, the application is accessed on the user device 120 via a website of the financial institution 12 maintained by the financial institution computing system 104 or otherwise accessible by the user device 120. Via the application, the customer can access various information about his or her accounts with the financial institution 102 (e.g., balances, interest rates, etc.), pay bills, view ATM and branch locations, and view additional services offered by the financial institution 102. For example, the customer may be able to remotely initiate (e.g., pre-stage) a transaction for execution by a nearby ATM 106 through an ATM pre-stage interface of the application as described in further detail below.

Figure 2:
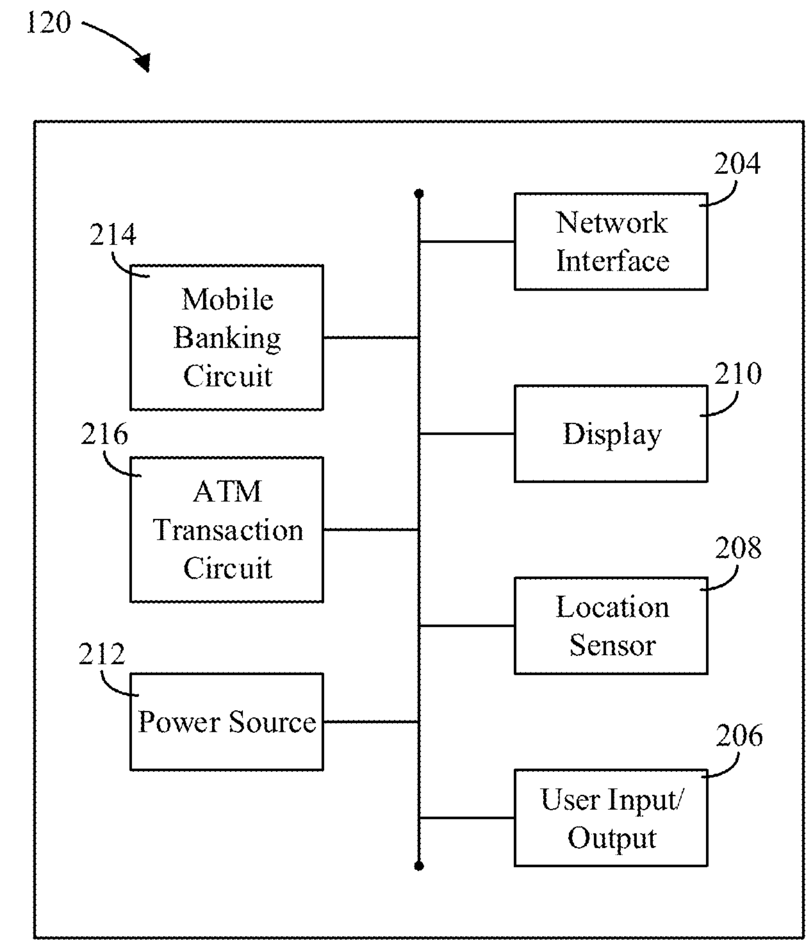
FIG. 2 is a block diagram of the user device according to an example embodiment.

Referring to FIG. 2, a block diagram of the user device 120 is shown according to an example embodiment. As discussed above, the user device 120 may be laptops, PDAs, portable media devices, smartphones, tablet computing devices, wearable computing devices (e.g., a smartwatch, smart optical wear, etc.), vehicle infotainment systems (e.g., a computing device mounted inside a vehicle and that includes a display and user input to present vehicle information, entertainment media, applications, navigation information and the like to passengers of a vehicle), etc. The user device 120 includes a network interface 202. The network interface 202 is a wireless network interface. The wireless network interface 202 includes any of a cellular transceiver (e.g., CDMA, GSM, LTE, etc.), a wireless network transceiver (e.g., 802.11X, ZigBee, Bluetooth, etc.), or a combination thereof (e.g., both a cellular transceiver and a Bluetooth transceiver). The network interface 202 is capable of receiving radio frequency transmissions from the locator beacons 118. Additionally, the network interface 202 is capable of communicating with the financial institution computing system 104 via the network 122 (e.g., via any combination of the Internet, cellular networks, personal area networks, Wifi networks, etc.).

The user device 120 includes a display 204 and a user input/output 206. In some arrangements, the display 204 and the user input/output 206 are combined (e.g., as a touchscreen display device). In other arrangements, the display 204 and the user input/output 206 are discrete devices. The user input/output 206 includes any of speakers, keyboards, notification LEDs, microphones, biometric sensors (e.g., fingerprint scanners), buttons, switches, cameras, or a combination thereof. In arrangements where the user device 120 is a vehicle infotainment system, the display 204 may be part of or integrated into the vehicle's dashboard.

In some arrangements, the user device 120 includes a location sensor 208. The location sensor 208 may be used to supplement location information determined based on the received position data. The location sensor 208 may be, for example, a GPS receiver, a GLONASS receiver, or the like.

The user device 120 includes a power source 212. The power source 212 may include grid power, battery power (e.g., alkaline batteries, rechargeable batteries, etc.), and/or another energy source. In arrangements where the power source 212 is a rechargeable battery, the user device 120 also includes circuitry configured to recharge the battery. In arrangements where the user device 120 is a vehicle infotainment system, the power source 212 may include a vehicle battery and/or an internal combustion engine that turns an alternator to generate electric power.

The functionality of the mobile device 120 described herein is controlled at least in part by the mobile banking circuit 214 and the ATM transaction circuit 216. Both the mobile banking circuit 214 and the ATM transaction circuit 216 are formed at least in part by the financial institution application associated with the financial institution 102. The mobile banking circuit 214 is structured to allow a customer of the financial institution 102 to manage accounts held with the financial institution via the mobile device 120 (e.g., to view balances, transfer funds, open accounts, close accounts, change contact information, etc.). The ATM transaction circuit 216 is structured to allow a customer to identify ATMs in the vicinity of to the customer (e.g., within a threshold distance, within a given locator beacon 118 broadcast range, etc.), make the customer's presence known to the identified ATM, and initiate a transaction remote from the identified ATM for completion at a later point in time. In some arrangements, the ATM transaction circuit is integrated into the mobile banking circuit 206.

Figure 3:
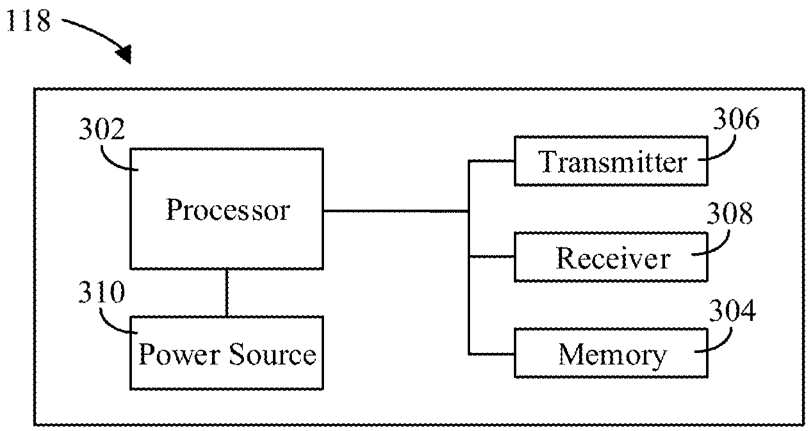
FIG. 3 is a block diagram of a location identifier device according to an example embodiment

Referring to FIG. 3, a block diagram of a locator beacon 118 is shown according to an example embodiment. The locator beacon 118 includes a processor 302 and memory 304. The memory 304 may include any combination of RAM, ROM, NVRAM, or the like as described herein below. The locator beacon 118 includes a radio frequency data transmitter 306. The transmitter 306 may be a Bluetooth® transmitter 306. In some arrangements, the locator beacon 118 is a two-way device and includes a receiver 308 capable of receiving radio frequency data transmissions. In such arrangements, the transmitter 306 and the receiver 308 may take the form of a transceiver capable of sending and receiving radio frequency data transmissions. The locator beacon 118 includes a power source 312. The power source 310 may include any combination of grid power and battery power (e.g., alkaline batteries, rechargeable batteries, etc.).

Figure 4:
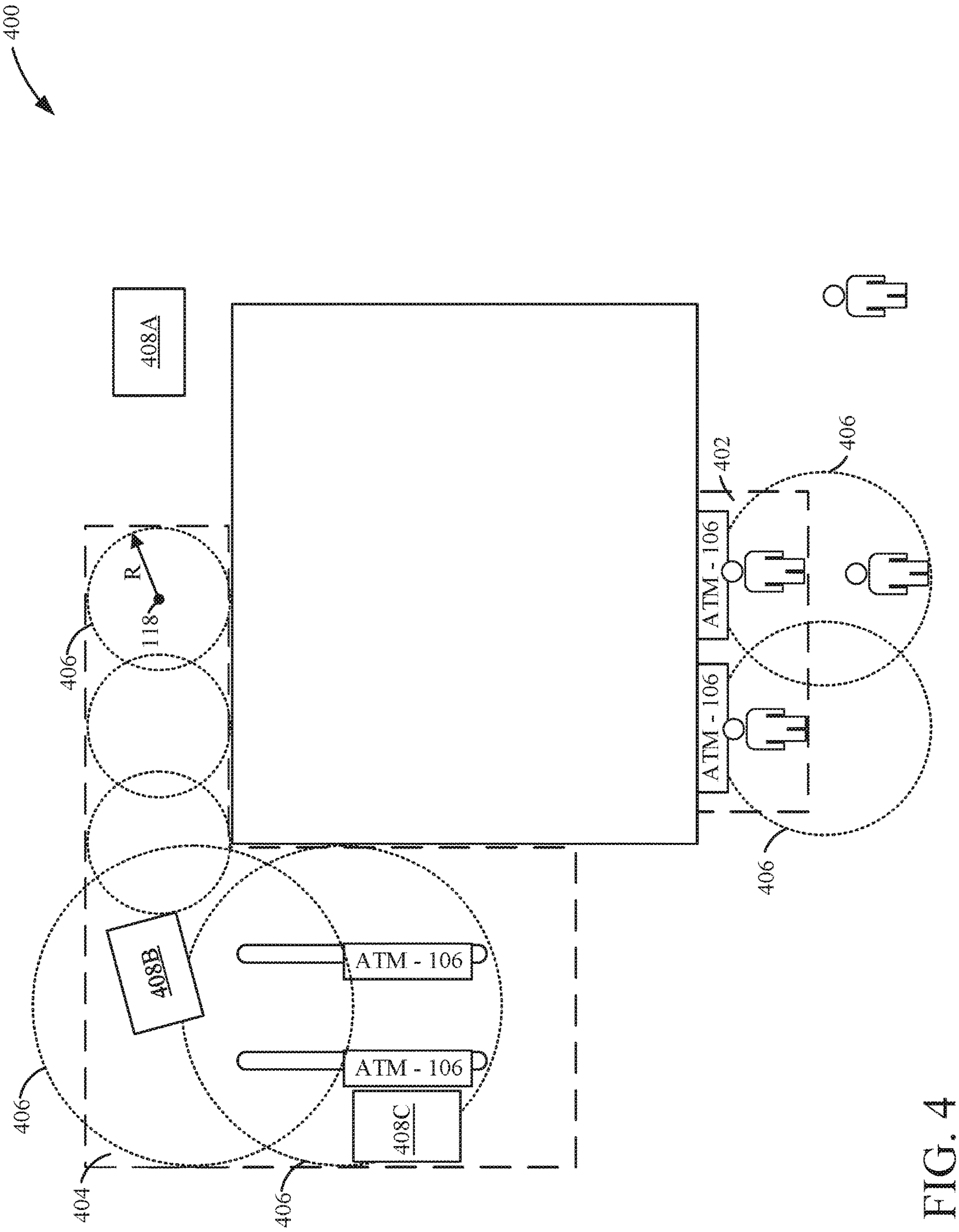
FIG. 4 is an overhead view of a bank branch according to an example embodiment.

Referring to FIG. 4, an overhead view of a bank branch 400 is shown according to an example embodiment. The bank branch 400 may be the physical location of the financial institution 102. The bank branch 400 includes a plurality of different customer areas, including an ATM area 402 having a plurality of walk-up ATMs 106, and a drive-through area 404 having a plurality of drive-up ATMs 106. Each customer area is geo-fenced with at least one locator beacon 118. Each of the locator beacons 118 has a broadcast radius R defining a broadcast zone 406. The broadcast zone 406 of each of the locator beacons 118 may be varied in size of the broadcast radius R (e.g., by varying the broadcast power of each locator beacon 118) and in shape (e.g., by using signal shaping shields). In some arrangements, the broadcast radii R of multiple locator beacons 118 overlap (e.g., as shown in the drive-through area 404 and in the ATM area 402). In other arrangements, the broadcast radii R of multiple locator beacons 118 do not overlap.

As described above, based on the received position data (e.g., unique beacon identifier, location information, etc.) provided to the financial institution computing system 104 by a customer's mobile device 120, the financial institution computing system 104 can transmit or enable an ATM pre-stage interface associated with the determined position that permits the customer to initiate an ATM transaction remote from a given ATM 106. The transaction may be pre-staged upon entry of the customer into the geo-fenced area. The location identifier device 118 may be placed outside and/or inside of the ATM area 402 to detect customers approaching the ATM area 402. To that end, as the customer enters the ATM area 402, the customer may wait in line due to the unavailability of an ATM. For example, each of the ATMs may be occupied by other customers. While a customer is in line waiting for an available ATM 106, the transaction may be pre-staged. In some embodiments, a customer may pre-stage a transaction while waiting in line for an available ATM 106, while other customers at the ATM 106 complete their respective pre-staged transactions. When an ATM 106 becomes available, the customer waiting in line may complete the pre-staged transaction.

In other examples, the transaction may be pre-staged upon entry of a vehicle (e.g., the vehicle 408A, 408B, 408C) into the geo-fenced area. FIG. 4 shows three different vehicles: 408A, 408B, 408C. The vehicle 408A has not yet entered the drive-through area 404; the vehicle 408B has entered the drive-through area 404; and the vehicle 408C is occupying an ATM 106 in the drive-through area 404. The locator beacon 118 may be placed in the driveway leading up to the drive-through area 404 to detect customers entering the drive-through area 404. The customers may be detected via the user device 120 associated with the customer and/or the vehicle. In some examples, the user device 120 may include an infotainment device (e.g., a device including a display, information, entertainment, media, applications, navigation, or a combination thereof) disposed in, for example, the vehicle 408B such that the financial institution computing system 102 transmits an ATM pre-stage interface to the infotainment device 120 before the vehicle 408B reaches the ATM 106. The infotainment device 120 may be disposed in or proximate to, for example, a dashboard, headrest, visor, etc. in the vehicle. While the customer associated with the vehicle 408B waits in the drive-through for an available ATM 106, the transaction may be pre-staged via the infotainment device 120. In some embodiments, the transaction may be pre-staged via the infotainment device 120 while the other customer associated with the vehicle 408C completes their respective pre-staged transaction. When an ATM 106 becomes available, the vehicle 408B may proceed to the available ATM 106 to complete the pre-staged transaction. The customer in the vehicle 408A may not have access to the ATM pre-stage interface because the vehicle 408A is not within an area geo-fenced by a locator beacon 118 associated with the drive-through area 404.

Figure 5:
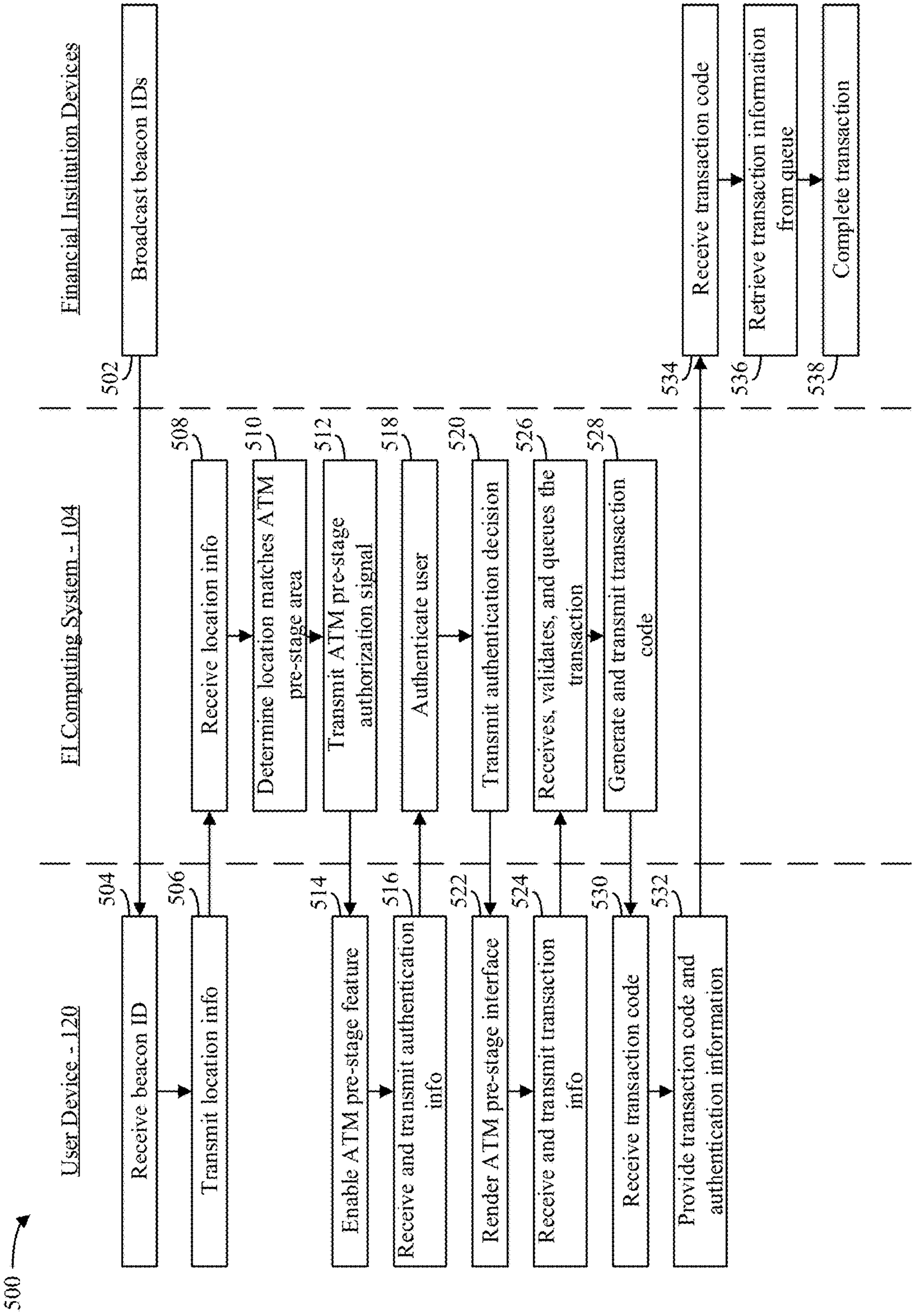
FIG. 5 is a flow diagram of a method of remotely initiating an ATM transaction based according to an example embodiment.

Referring to FIG. 5, a flow diagram of a method 500 of remotely initiating an ATM transaction is described according to an example embodiment. The flow diagram details the interaction between a user device 120 (the left most column) and a financial institution computing system 104, and various devices associated with the financial institution 102 (e.g., an ATM 106 and locator beacons 118).

The method 500 begins when beacon identifiers are broadcast by the locator beacons 118 at 502. The locator beacons 118 are positioned at designated areas associated with ATMs 106 of the financial institution (e.g., in the lobby, in an ATM area, in a drive-through area, etc.). Each of the locator beacons 118 wirelessly broadcasts a unique beacon identifier (e.g., a serial number, an SSID, etc.) to a distance of a broadcast radius of the beacon. Each locator beacon 118 is associated with an area and geo-fences that area with the broadcasted identifier. Accordingly, if a device (e.g., the user device 120) receives a certain beacon identifier (or combination of beacon identifiers), the location of the device is known to be within the broadcast range of the beacon associated with the identifier. The user device 120 receives a beacon identifier at 504. When the user device 120 enters the broadcast area of a given locator beacon 118, the user device 120 receives the beacon identifier associated with the given locator beacon 118.

In some arrangements, in some arrangements, the user device 120 transmits location information determined independent from the locator beacons 118, such as GPS coordinates, cellular network triangulation information, or the like, to the financial institution computing system 104. In such arrangements, steps 502 and 504 may be skipped, and the non-beacon location information is provided directly from the user device 120 to the financial institution computing system 104 at 506 as described in further detail below.

The user device transmits location information to the financial institution computing system at 104 at 506. The location information is electronic information indicating a particular location of the user device 120. The transmission of the location information from the user device 120 to the financial institution computing system 104 may be facilitated via the mobile banking circuit 214 or the ATM transaction circuit 216. In some arrangements, the location information relates to a beacon identifier transmitted by a locator beacon 118. In such arrangements, receipt of the beacon identifier may automatically trigger the user device 120 to transmit the location information to the financial institution computing system 104. In other arrangements, the location information relates to location information determined by the user device 120 (e.g., GPS coordinates).

In arrangements where the user device 120 transmits location information determined independent from the locator beacons 118, such as GPS coordinates, cellular network triangulation information, or the like, to the financial institution computing system 104 may skip steps 502 through 506. In further arrangements, steps 502 and 504 may be skipped when the customer is recognized as being near an ATM 106 based on recognition of the customer or the customer's vehicle by a camera or security system associated with the financial institution 102. If the customer approaches the ATM 106, a camera associated with the financial institution 102 can perform facial recognition on the customer to identify the customer as being near the ATM 106. If the customer is driving a known vehicle through a drive-through ATM location, the camera associated with the financial institution 102 can identify the vehicle and the customer based on a vehicle attribute (e.g., license plate number, VIN, make/model of the vehicle, etc.). In such arrangements, steps 502 through 506 may be skipped in the method 500.

The financial institution computing system 104 receives the location information associated with the user device 120 at 508. The location information is used by the financial institution computing system 104 to determine the position of the user device 120. In arrangements where the location information is or relates to a beacon identifier, the financial institution computing system 104 cross-references the ATM database 116 to identify ATMs 106 in the vicinity of the user device 120. In arrangements where the location information relates to other location information (e.g., GPS coordinates), the financial institution computing system 104 can cross-reference the location of the user device against the known locations of the ATMs to determine whether the user and/or customer is within a predetermined range of a given ATM 106. The financial institution computing system 104 determines that the user device 120 matches a location authorized for prestaging an ATM transaction at 510. For example, the location of the user device may be within a threshold distance or a geo-fenced area of a given ATM 106.

Still referring to FIG. 5, the method 500 continues at 512 when the financial institution computing system 104 transmits an ATM pre-stage authorization signal to the user device 120. The ATM pre-stage authorization signal authorizes an ATM pre-stage function of the mobile banking application associated with the financial institution 102 (e.g., activates the ATM transaction circuit 216 of the user device 120). In some arrangements, the ATM pre-stage authorization signal includes a user interface of a mobile banking application for display at the user device 120. The ATM pre-stage interface may be transmitted via the network 122 such as the Internet, cellular network, etc. When the user device 120 receives the user interface, the user device 120 can render the user interface if the user is properly authenticated. The user interface may relate to an interface that allows the user to remotely initiate or otherwise pre-stage an ATM transaction. Remotely initiating the ATM transaction may be done while the user waits in line in an ATM area, drive-through, etc. Based on receipt of the ATM pre-stage authorization signal, the user device 120 enables an ATM pre-stage feature at 514. As described above, the ATM pre-stage feature may be an existing feature of the mobile banking application that is activated by the ATM pre-stage authorization signal or a new feature (e.g., a new user interface) transmitted to the user device 120.

Prior to allowing a user of the user device 120 to initiate an ATM transaction, the user must be authenticated as an account holder. Accordingly, at 516, the user device 120 receives and transmits user authentication information to the financial institution computing system 104. As used herein, the term "user authentication information" refers to data indicative of the identity of a customer and/or user of the user device 120 that is requesting the initiation of an ATM transaction via the user device 120. The user device 120 receives the user authentication data via a user input provided by the user. The user authentication information includes any of a password, a PIN (personal identification number), a user ID, an answer to a verification question, a biometric (e.g., a picture of the user's face, a fingerprint, a voice sample, a retina scan, etc.), an identification of a security image, or a combination thereof. In some arrangements, the user's possession of the user device 120 may also serve as a factor in authenticating the user (e.g., because a device identifier stored on the user device 120 during installation of a mobile banking application and a device identifier establishes a device-binding of the user device 120 to the user). Hence, for example, a two-factor authentication may be achieved based on the user's possession of the user device 120 and entry of a password, PIN (e.g., a 4-digit pin), biometric, or any other previously listed authentication factor into the user device 120. The user authentication information is transmitted to the financial institution computing system 104 for verification.

The financial institution computing system 104 authenticates the user of the user device 120 at 518. The financial institution computing system 104 compares the received user authentication information with known and verified user authentication information. In some arrangements, the user may be authenticated prior to arriving in front of the ATM 106. Accordingly, the user may not be further authenticated when arriving at the ATM. In arrangements in which further authentication is not performed at the ATM 106, the user may be authenticated responsive to detecting the presence of the user in the ATM area 402 and/or in the drive-through area 404. For example, the user may be authenticated via license plate recognition when the car is parked in front of the ATM machine, via NFC detection of the user device 120, etc. as described herein below. Advantageously, when the user arrives at the ATM 106, their license plate is recognized, their user device 120 is detected, or the like and the ATM 106 completes the transaction without further interaction from the user as described herein below.

If the user authentication information provided at 516 matches the known and verified user authentication information, the user of the user device 120 is authenticated. If the user authentication information provided at 516 does not match the known and verified user authentication information, the user of the user device 120 is not authenticated, and the method 500 ends. The description of the method 500 continues for the situation in which the user is authenticated. The financial institution computing system 104 transmits the authentication decision to the user device 120 at 520. As discussed above, the authentication decision indicates that the user of the user device 120 is authenticated.

After receiving the user authentication decision at 520, the user device 120 renders the ATM pre-stage interface at 522. The ATM pre-stage interface is presented via the display 210 of the user device 120. In some arrangements, the ATM pre-stage interface is substantially the same interface the user would experience at the ATM 106 but reformatted to fit the display 210 and capabilities of the user device 120. The ATM pre-stage interface presents different options and transaction types for the user to select based on the transaction type (e.g., deposit funds, withdraw funds, transfers, account balance, account statement, charity donation, direct deposit advance, etc.). As described above, the ATM pre-stage interface may relate to an interface that allows the user to remotely initiate (i.e., pre-stage) a transaction for execution by an ATM 106 associated with the financial institution 102. For example, the user may initiate or pre-stage a transaction while the user waits in line for an ATM 106. In arrangements where the user is accessing the ATM pre-stage interface from a vehicle, the interface may be an audio interface presented over the vehicle's audio system.

For example, the user may want to withdraw funds from an ATM. Accordingly, the user selects, via a link, button, icon, graphic, etc. of the ATM pre-stage interface, the transaction type "withdraw funds". The user can the select an account and an amount of funds to withdraw from the account via the ATM pre-stage interface. For example, the user may select account "0001," corresponding to the user's checking account and enter a funds amount of $100 via the ATM pre-stage interface.

Accordingly, the user device 120 receives transaction information from the user and transmits the transaction information to the financial institution computing system 104 at 524. As described above, the user can enter transaction information into the user device 120 via the ATM pre-stage interface. Upon selection of a button, link, etc. such as "Enter", "Submit", or "Continue" to otherwise indicate the user's submission of the requested transaction data, the user device 120 generates a remote transaction request including the transaction information (e.g., transaction type, account number, amount of funds, etc.). The user device transmits the transaction information to the financial institution computing system 104. The transaction information may be included in a transaction request message generated by the user device 120 (e.g., via the ATM transaction circuit 216).

The financial institution computing system 104 receives the transaction information, validates the transaction information, and queues the transaction for completion at 526. The transaction information may be packaged as part of a transaction request message received from the user device 120. In some arrangements, the financial institution computing system 104 stores the transaction request message in memory, a database, etc. The transaction information is validated by the financial institution computing system 104 to ensure that the user has the appropriate funds available to complete the transaction and that the transaction is within a range of accepted transactions (e.g., within the ATM withdrawal limit). If the transaction information is validated, an initiated transaction is generated and queued by the financial institution computing system 104. The financial institution computing system 104 may generate a transaction identifier (e.g., a transaction number) and store the transaction information in a database (e.g., the ATM database 116) for later retrieval and completion. The transactions in the transaction queue are transactions remotely initiated (e.g., by user devices) that require completion at an ATM 106.

The financial institution computing system 104 generates and transmits a transaction code to the user device 120 at 528. The transaction code is used by the user of the user device 120 to retrieve the initiated transaction and to complete the transaction at an ATM 106. For example, the transaction code may be a one-time passcode, a QR code, a digital token transmitted via NFC to the ATM 106, etc. When the user approaches the ATM 106 to complete the initiated transaction, the user provides the transaction code to the ATM 106 (e.g., by entering the one-time passcode via the keypad of the ATM 106, by presenting a QR code on the display 210 of the user device 120 for scanning via a scanner of the ATM 106, by tapping the user device 120 to transmit a token via NFC to the ATM 106, etc. In some arrangements, a transaction code is not needed and the transaction is linked to the user's account (e.g., to the user's debit card). In such arrangements, the user can authenticate himself to the ATM 106 by dipping, swiping, or otherwise providing his debit account number to the ATM and entering his PIN. Once authenticated, the user can be presented with a listing of available initiated and not yet completed transactions to complete. In these arrangements, the method skips from 526 to 536.

After receiving the transaction code at 530, the user can go to an ATM 106 associated with the financial institution 102 to complete the transaction. In order to complete the remote transaction request, the financial institution 102 ensures that the user is paired to the correct queued transaction request. Accordingly, the method 500 continues when the user device 120 provides the transaction code and authentication information to the ATM 106 at 532. The ATM 106 receives the transaction code at 534. In some arrangements, the ATM 106 scans a code (e.g., a barcode, a QR code, etc.) displayed on the display 210 of the user device 120. In some arrangements, the user manually keys in the transaction code via an input device (e.g., a key, key pad, etc.) mounted on or configured within the ATM 106.

Alternatively, the user does not enter transaction information in order to complete the pre-staged transaction. The user interactions at the ATM 106 consists of establishing a wireless connection between the user device and the ATM and retrieving funds dispensed by the ATM. In such arrangements, the ATM 106 receives a digital code (e.g., a token, a data packet, etc.) via a wireless data connection between the ATM 106 and the user device 120 (e.g., a NFC data connection, a Bluetooth data connection, etc.). For example, the user may tap the user device 120 (e.g., a smartphone) on a surface of the ATM 106. Advantageously, user does not have to first enter transaction information to complete the transaction. For example, the user does not enter transaction information via the keypad of the ATM 106 or other input devices mounted on, configured within, or otherwise associated with the ATM 106 (e.g., audio receiver, touch display, etc.). After establishing the wireless data connection between the ATM 106 and the user device 120, the ATM 106 automatically completes the transaction by dispensing funds, receiving funds (e.g., in a deposit transaction), printing a receipt, displaying an account balance, transferring funds, and the like as described herein below at 538.

Based on the received transaction code, the ATM 106 retrieves transaction information from the financial institution computing system 104. The transaction information includes the types of accounts associated with the transaction, the transaction type, funds amount, or a combination thereof. In some arrangements, the ATM 106 sends a request with the transaction code to the financial institution computing system 104 to retrieve the transaction information. In such arrangements, the financial institution computing system 104 cross-references the ATM database 116 and provides the transaction information corresponding to the initiated or pre-staged ATM transaction. In other arrangements, the ATM 106 directly accesses the ATM database 116 to pull the transaction information corresponding to the initiated or pre-staged ATM transaction.

In some arrangements, the financial institution computing system 104 can push the transaction information to the ATM 106 automatically based, in part, on the position of the user. For example, the financial institution computing system can push the transaction information to the ATM 106 when the financial institution computing system 104 determines that the user is at, or near, the ATM 106 based on position data received from the user device 120. In a further example, the financial institution computing system 104 can push the transaction information to the ATM 106 when the user is determined to be at the ATM based on information gathered from an audio and/or video surveillance device near the ATM 106. The surveillance device may be positioned within the ATM 106, in the ATM area, and/or in the drive-through area. In some arrangements, the surveillance device may be configured to recognize a user based on an algorithm configured for license plate recognition, biometric recognition (e.g., facial, finger, eye, hand, voice, etc. recognition associated with a particular user), etc. For example, as a vehicle of a user enters the drive-through, the license plate may be captured by the surveillance device. The financial institution computing system 104 may then determine whether the license plate identifier matches stored license plate identifiers or is otherwise associated with an account or transaction of a user. Upon identifying a match of the license plate, the financial institution computing system 104 may push the transaction information to the ATM 106.

In further arrangements, the financial institution computing system 104 can automatically push the transaction information to the ATM 106 after the user is authenticated at the ATM 106. For example, the user can authenticate himself at the ATM via a biometric recognition (e.g., a facial recognition), via inserting his debit card and providing a PIN, and the like. If authenticated, the financial computing system 104 can then identify initiated transactions associated with the user and automatically push the associated transaction information to the ATM 106.

After the ATM 106 receives the transaction information, the ATM 106 completes the transaction at 538. For example, with reference to the above example including the transaction type "withdraw funds," the ATM 106 dispenses the funds amount (e.g., $100) requested by the user in the pre-staged ATM transaction request. In other examples, the ATM 106 can complete the transaction by receiving funds (e.g., in a deposit), printing a receipt, displaying an account balance, transferring funds, and the like.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An example system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system comprising:

a database that stores user information regarding a plurality of customers;

a network interface configured to communicate data over a network; and a processing circuit comprising a processor and a memory, the memory structured to store instructions that, when executed by the processor, cause the processing circuit to:

receive, from a customer computing device, a first indication that a customer is within a first predetermined distance of a first customer area, wherein the first predetermined distance is associated with the first customer area, the first customer area associated with a terminal;

activate, based on the first indication, an interface of the customer computing device, the interface configured to receive an input and a transaction preference of the customer that identifies an account of the customer and a financial action;

receive a second indication that the customer is within a second predetermined distance of a second customer area, the second indication received based at least in part on image data captured by a device associated with the first customer area, wherein the second customer area is within the first customer area and the second predetermined distance is less than the first predetermined distance; and authorize, based on the second indication and reception of the input, a transaction at the terminal, wherein the terminal automatically receives the input responsive to the reception of the second indication, wherein authorizing the transaction comprises:

determining that the account has sufficient funds to perform the financial action;

generating, responsive to the determination that the account has sufficient funds to perform the financial action, a transaction code uniquely identifying transaction parameters associated with the transaction; and transmitting, over the network via the network interface, the generated transaction code to the customer computing device.

2. The system of claim 1, wherein the instructions, when executed by the processor, further cause the processing circuit to:

receive authentication information from the customer computing device; and authenticate the customer by comparing the received authentication information to information stored in the database.

3. The system of claim 2, wherein the instructions, when executed by the processor, further cause the processing circuit to provide a second interface of the customer computing device responsive to the customer being authenticated.

4. The system of claim 3, wherein the authentication information includes at least one of a password, a PIN, a customer identification number, a customer answer to a verification question, customer biometric data, or a customer image.

5. The system of claim 1, wherein the instructions, when executed by the processor, further cause the processing circuit to:

transmit, based on the second indication and by the network interface over the network, transaction information regarding the transaction at the terminal.

6. The system of claim 1, wherein the second indication that the customer is within the second predetermined distance of the second customer area is received from the customer computing device.

7. The system of claim 6, wherein the second indication that the customer is within the second predetermined distance of the second customer area includes location information regarding the customer computing device.

8. The system of claim 1, wherein the second indication that the customer is within the second predetermined distance of the second customer area is based upon information obtained via a surveillance device.

9. The system of claim 1, wherein the instructions, when executed by the processor, further cause the processing circuit to:

receive a transaction request from the terminal that includes the generated transaction code; and transmit the transaction parameters to the terminal responsive to receiving the transaction request.

10. The system of claim 9, wherein the transaction code is one of a QR code or a barcode.

11. A method, comprising:

receiving, by a computing system associated with an institution, a first indication that a customer is within a first predetermined distance of a first customer area, wherein the first predetermined distance is associated with the first customer area, the first customer area associated with a terminal;

activating, based on the first indication, an interface of a customer computing device associated with the customer, the interface configured to receive an input and a transaction preference of the customer that identifies an account of the customer and a financial action;

receiving, by the computing system, a second indication that the customer is within a second predetermined distance of a second customer area, the second indication received based at least in part on image data captured by a device associated with the first customer area, wherein the second customer area is within the first customer area and the second predetermined distance is less than the first predetermined distance; and authorizing, by the computing system based on the second indication and reception of the input, a transaction at the terminal, wherein the terminal automatically receives the input responsive to the reception of the second indication, wherein authorizing the transaction comprises:

determining, by the computing system, that the account has sufficient funds to perform the financial action;

generating, by the computing system responsive to determining that the account has sufficient funds to perform the financial action, a transaction code uniquely identifying transaction parameters associated with the transaction; and transmitting, by the computing system, the generated transaction code to the customer computing device.

12. The method of claim 11, further comprising:

receiving, by the computing system, authentication information from the customer computing device;

authenticating, by the computing system, the customer by comparing the received authentication information to information stored in the computing system; and transmitting, by the computing system and responsive to authenticating the customer, an authentication decision to the customer computing device, the authentication decision configured to enable the customer to access a second interface of the customer computing device.

13. The method of claim 11, wherein the first indication that the customer is within the first predetermined distance of the terminal is received from the customer computing device and includes location information associated with the customer computing device.

14. The method of claim 13, wherein the location information includes at least one of data captured by a location sensor associated with the customer computing device or data that identifies a location associated with the terminal.

15. The method of claim 11, further comprising:

receiving, by the computing system, a transaction request from the terminal that includes the generated transaction code; and transmitting, by the computing system, the transaction parameters to the terminal responsive to receiving the transaction request.

16. A user device, comprising:

a network interface structured to communicate data to and from a computing system of an institution and terminal in a first customer area;

a display device configured to present information to a customer; and a processing circuit comprising a processor and a memory, the memory structured to store instructions that, when executed by the processor, cause the processing circuit to:

transmit, via the network interface, first location information to the computing system of the institution, the first location information indicating that the user device is within a first predetermined distance of the first customer area, wherein the first predetermined distance is associated with the first customer area, the first customer area associated with the terminal;

present, by the display device and based on the first location information indicating that the user device is within the first predetermined distance of the first customer area, an interface to the customer, the interface configured to receive an input;

transmit, by the network interface, second location information to the computing system of the institution, the second location information indicating that the user device is within a second predetermined distance of a second customer area and determined based at least in part on image data captured by a device associated with the first customer area, wherein the second customer area is within the first customer area and the second predetermined distance is less than the first predetermined distance;

automatically transmit, via the network interface responsive to transmitting the second location information indicating that the user device is within the second predetermined distance of the second customer area and the input, a transaction preference to the computing system of the institution, the transaction preference associated with a transaction at the terminal; and receive, via the network interface, a transaction code from the computing system of the institution, the transaction code identifying the transaction at the terminal that conforms with the transaction preference, the transaction code including at least one of a QR code, a barcode, or a transaction token.

17. The user device of claim 16, wherein the instructions, when executed by the processor, further cause the processing circuit to:

present, via the display device, an authentication interface to the customer configured to receive authentication data;

receive authentication data via the authentication interface;

transmit, via the network interface, the authentication data to the computing system of the institution; and receive, via the network interface, an authentication decision from the computing system of the institution, wherein presentation of the interface only occurs if the received authentication decision indicates that the customer is authenticated.

* * * * *